Patented Sept. 22, 1953

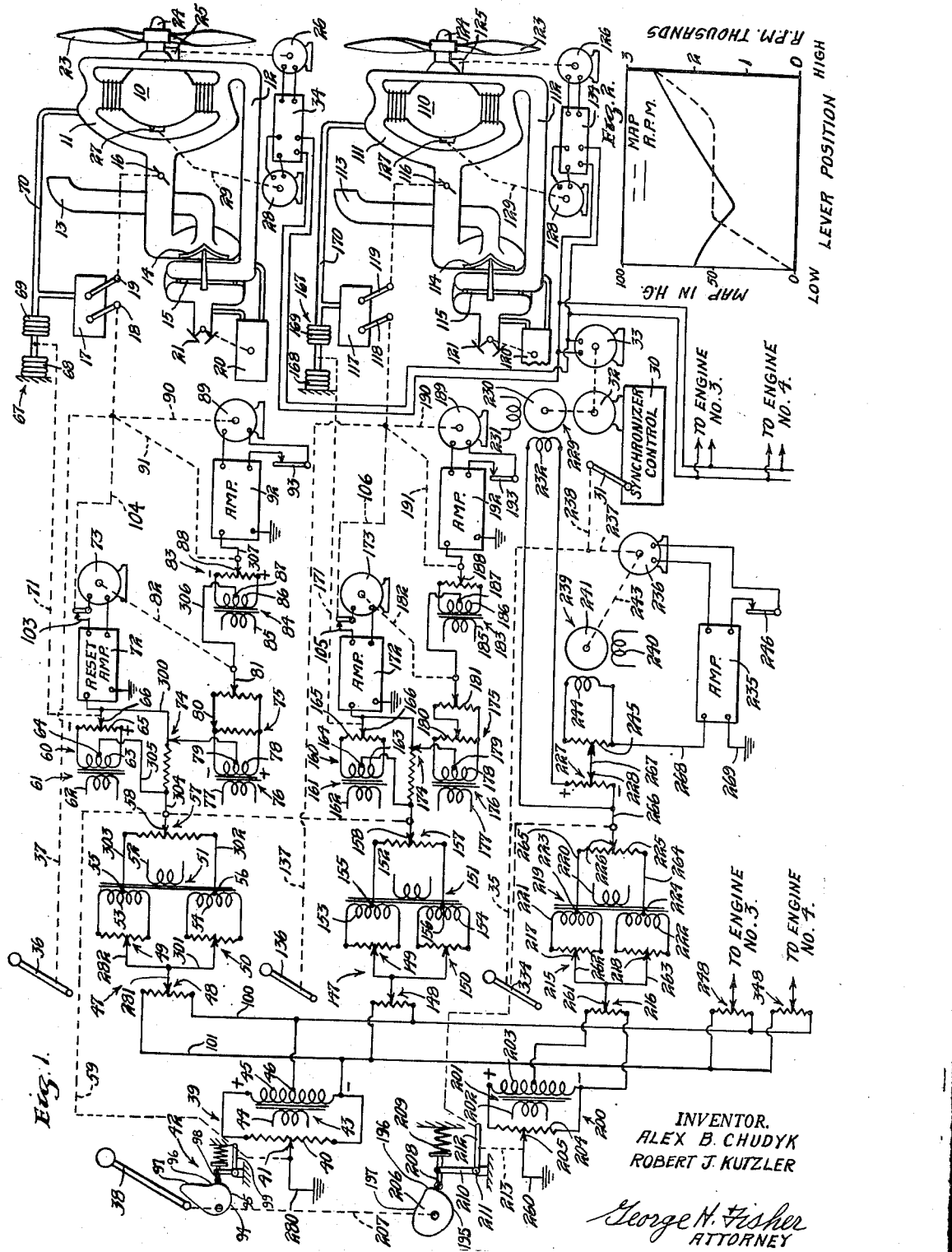

2,652,896

UNITED STATES PATENT OFFICE 2,652,896

COMBUSTION ENGINE POWER CONTROL APPARATUS

Alex B. Chudyk, St. Louis Park, and Robert J. Kutzler, Minneapolis, Minn., assignors to Minneapolis-Honeywell Regulator Company, Minneapolis, Minn., a corporation of Delaware Application October 8, 1948, Serial No. 53,522

8 Claims. (Cl. 170—135.74)

The present invention is concerned with an apparatus for controlling the power output of a multiengine internal combustion type power plant system having a controlling device for adjusting manifold pressure of each engine and a controller for determining the engine speed of all of the engines and synchronizing the engine speeds. More particularly, the invention is concerned with providing an apparatus with a single manually operable lever for coordinating the manifold pressure and engine speeds of all of the engines of a multiengine power plant so as to control the power output of all of the engines of the power plant in accordance with the positioning of the single lever.

In present day aircraft, particularly those type of aircraft employing several engines, the pilot or flight engineer is presented with a maze of controls necessary to maintain the craft in flight. To eliminate confusion and simplify controlling the operation of the engines, the provision of a single control lever for the power plant of the craft will substantially free the operator's attention from the engines. The single lever controller is effective to position suitable motor means through an appropriate electrical control apparatus. Each engine of the aircraft may be provided with an individual manifold pressure controller which is individually adjustable by manual means. Further, an engine speed controller may be provided for selecting the speed of the engine and further, synchronizing the engine speeds. This controller may also be individually adjustable. Without the single power selector lever, the pilot must coordinate the movement of five levers and further, must select the settings of those levers from power control charts so that the most economical operation may be had from the engines. The provision of a single lever control, as set forth in the present invention, eliminates the complexities of engine power control and insures that there is continuous coordination between all of the engines of the power plant.

It is therefore an object of the present invention to provide a single lever power control for a multiengine power plant where each of the engines has manifold pressure regulators and there is an engine speed and synchronizer controller for all of the engines.

Another object of the present invention is to provide an improved single lever controller which is operative through an electrical network to synchronize and coordinate the adjustments of the manifold pressure regulators of a plurality of engines and the adjustment of an engine speed controller so that the power output of all of the engines will be controlled from a single source.

A further object of the present invention is to provide a single lever power control for a multiengine power plant with each of the engines having a manifold pressure controller and an engine speed controller for all of the engines with motor means for adjusting the controllers and providing calibration for an electrical network interconnecting the lever and motor means which is variably adjusted by movement of the power control lever.

Still another object of the present invention is to provide an improved multiengine speed and manifold pressure coordinator having a single lever for selecting the control desired and a manifold pressure control network interconnecting the lever and the manifold pressure controller which has therein means for by-passing errors of indexing and controlling in the manifold pressure controller to maintain a substantially constant manifold pressure on all of the engines.

A still further object of the present invention is to provide an improved multiengine speed and manifold pressure coordinator having a single lever for selecting the control desired and an engine speed control network interconnecting the lever and the speed controller having therein means for by-passing the indexing error of the speed controller so as to always maintain a predetermined speed for each setting of the lever.

These and other objects of the present invention will be understood upon considering the following specification, claims and drawings of which:

Figure 1 is a schematic showing of the present invention and associated with manifold pressure controllers of a plurality of engines and a speed and synchronizer controller for the engine; and Figure 2 is a graphical showing of one manner in which the manifold pressure and engine speed may be coordinated by the single lever control of the present invention.

Referring now to Figure 1, the numeral 10 represents an internal combustion engine which may be an aircraft engine of the reciprocating type. The numeral 11 indicates the intake manifold for the engine 10 while the numeral 12 represents the exhaust manifold for the engine. An air intake 13 is provided to supply air to a compressor 14 which is driven by an exhaust driven turbine 15 located in exhaust manifold 12. A throttle valve 16 is located between the compressor 14 and the intake manifold 11 and is used to control the intake manifold pressure. The positioning of valve 16 is accomplished by a manifold pressure controller indicated generally at 17 which controller is shown with a control point adjusting lever 18 and a controlling lever 19.

This manifold pressure controller may be of the type disclosed in the patent to C. E. Cole, No. 2,444,185, issued June 29, 1948. This patent shows an arrangement where, as applied to the present apparatus, the manually positioned lever 18 is used to position the output lever 19 by making an adjustment on a pressure sensing device sensing manifold pressure through a conduit 70. The pressure sensing device is effective to position a pilot valve in a hydraulic system whenever there is a deviation in manifold pressure from the value selected by the manually positioned lever 18. The positioning of the pilot valve causes a servo piston to readjust the position of the throttle 16 by way of lever 19 until the manifold pressure is at that value which has been selected by the positioning of lever 18. The apparatus may further be arranged so that a failure of the hydraulic system results in a direct connection between the throttle 16 and control selecting lever 18. Thus positioning of the lever 18 will always result in the controlling of the throttle 16.

Controlling the operation of the exhaust driven turbine is a differential pressure controller 20 which senses the pressure drop across the turbine 15. This differential controller is set to maintain a constant pressure drop across the turbine. If the throttle is opened, it is necessary for the amount of air supplied to the intake manifold 11 by the compressor 14 to be increased. This increase in pressure is accomplished by the differential controller which is operative to position a pair of gates indicated at 21 on the exhaust manifold 12. The opening of the throttle will cause an increase in exhaust pressure and in order for a constant pressure drop to be maintained across the throttle, it is necessary that the gates 21 be opened. The opening of the gates will cause the turbine speed to increase and therefore, the air compressed will increase to compensate for the opening of the throttle. The reverse action will be true when the throttle is closed.

The actual differential controller may consist of a pair of opposed pneumatic bellows. One of the bellows will be sensing to the exhaust gas pressure on the upstream side of the turbine 15 and the other will be sensing to the pressure on the downstream side of the turbine. One of the bellows will be working against an adjustable spring loading device which loading device will determine the differential pressure drop that will be maintained across the turbine 15. A deviation in the pressure differential from the desired value will result in the bellows positioning a pilot valve in a hydraulic system so that a servo piston will make adjustment on the gates 21. This adjustment could also be accomplished electrically if the bellows positioned a floating switch in an electric motor circuit. A patent showing a supercharger controller which includes a device responsive to a differential pressure is a Shoults patent, No. 2,374,708, issued May 1, 1945.

Driven by the engine 10 is a propeller having a plurality of blades 23 connected to a propeller hub 24. Each of the blades may have its pitch automatically adjusted by a device indicated generally at 25. The positioning of this device may be accomplished by a propeller pitch controller motor indicated at 26. An engine speed tachometer device 27 is used to measure the speed at which the engine is rotating and this device is connected to an alternating current generator 28 by suitable connecting means 29.

Controlling the speed of the engine 10 is a synchronizer controller 30 which has a control point selecting lever 31 which, when varied in position, varies the speed of the engine by changing the loading of the engine. The engine loading is accomplished by varying the propeller pitch by pitch controller motor 26. A patent showing such a synchronizer and speed control unit is a patent to G. W. Brady, No. 2,217,856, issued October 15, 1940. Reference should be made to this Brady patent for a more detailed consideration of the synchronizer unit; however, the following will give a basic understanding of the operation of the unit. The lever 31 is effective to vary the speed of a motor 32 which in turn is driving a standard alternating current generator 33. The outputs from the alternating current generators 28 and 33 are fed into a suitable control unit indicated generally at 34 which is operable, when there is a frequency difference between the frequencies of the standard generator 33 and the engine generator 28, to cause operation of the propeller pitch control motor 26. Operation of the motor 26 will adjust the propeller pitch and will result in a change in speed of the engine. When the frequencies of the alternating current generators 28 and 33 are the same, there will be no output from the coordinator 34 to drive the pitch control motor 26.

The positioning of the speed selector lever 31 may be accomplished by the manual control lever 334 which is connected to lever 31 by suitable connecting means 35 and 233. The adjustment of the control point adjuster 18 of the manifold pressure selector 17 may be accomplished by a manual control lever 36 operating through suitable connecting means 37.

A second engine is indicated by the the numeral 110. The parts of the engine 110 and the controls therefor carry the same reference numerals as the engine 10 with an additional numeral "1" before the number. Thus it may be seen that the intake manifold of engine 110 is indicated by the numeral 111 and this engine further has an exhaust manifold 112. An air intake 113 is used to supply air to a centrifugal compressor 114, the latter of which is given by an exhaust driven turbine 115 which is located in the exhaust manifold 112. A throttle valve 116 is located between the intake manifold 111 and the compressor 114 to control the intake manifold pressure. The positioning of the throttle 116 is accomplished by a manifold pressure controller indicated generally at 117 and this controller has a manifold selecting adjuster 118 and a throttle positioner 119. This engine is also supplied with a differential pressure adjuster 120 which is operable to position the gate 121 on the exhaust manifold 112 in accordance with the pressure drop across the turbine 115.

This engine, engine 110, is driving a plurality of propeller blades 123 which are connected to a propeller hub 124. The propeller pitch is adjusted by a suitable propeller adjusting means 125, the latter of which is positioned by a suitable control motor 126. The numeral 127 indicates the tachometer for the engine and this tachometer is operable to drive an alternating current generator 128 through suitable coupling means 129.

The engine load and speed controller 30 is also effective upon engine 110 and the output from the alternating current generator 33, which is the standard generator, is compared in the control device 134 with the output frequency of the engine generator 128. The output from this control device is effective to position the propeller pitch control motor 126 whenever there is a deviation in frequency between the standard generator 33 and the engine generator 128 in the same manner as occurs with the engine 10.

A manual adjuster is provided for the manifold pressure selector 117 by provision of a manual lever 136 which is connected to the control point selector 118 by suitable connecting means 137.

To simplify the discussion of the operation of the present invention, only two engines have been shown. However, it will be understood that the apparatus may be used with a four engine control or a six engine control, or as many as desired.

The automatic positioning of the control point adjusters of the manifold pressure selectors 18 and 118 of each of the engines and of the engine speed selector 30, is accomplished by the positioning of a single power selecting control lever 38 which, operating through an appropriate camming device and electrical control network, causes the positioning of control motors which are effective to position the controls of the manifold pressure selectors and the speed controller. The power selecting lever 38 as well as levers 334, 36 and 136 may be located in the pilot's compartment or with the flight engineer.

The positioning controls for the manifold pressure control point adjuster include, namely, a balanceable electrical network whose output is connected into an amplifier which determines the direction of unbalance of the network and which in turn drives a controlling motor. The controlling motor positions the adjusting device of the manifold pressure controller and also effectively rebalances the electrical network. The selecting portion of the electrical network includes a manually adjusted network 39. This network 39 includes an adjustable potentiometer 40 having a slider 41, connected to the main control lever 38 through suitable camming means 42, and a transformer 43 having a primary winding 44 and a secondary winding 45 which is tapped at 46. The calibrating portion of the subject control network is indicated generally by the numeral 47 and may be seen to consist of a cruise calibration potentiometer 48, a low power calibration potentiometer 49, and a high power calibration potentiometer 50. The cruise calibration potentiometer 48 has an adjustable slider and the end terminals of the potentiometer are connected to the lower portion of secondary 45 between the tap 46 and the lower terminal of secondary 45 by conductors 100 and 101 respectively. Supplying power to the low and high power calibration potentiometers is a transformer 51 which has a primary winding 52, connected to any suitable source of power, and a pair of secondary windings 53 and 54, which windings are tapped at 55 and 56 respectively.

Connected to the taps 55 and 56 of the secondaries 53 and 54 is a calibration selecting potentiometer 57 with a slider or adjusting means 58 which is connected by suitable connecting means 59 to the camming means 42 so that movement of the control lever 38 in positioning slider 41 will result in the corresponding movement of the adjusting means 58 so that it will be possible to variably select the calibration desired, as will be explained more fully later.

A pressure responsive network is indicated by the numeral 60 and may be seen to include a transformer 61 having a primary winding 62, connected to a common source of power, and a secondary winding 63 which is tapped at 64. Connected to this secondary transformer winding 63 is a potentiometer 65 having an adjusting slider 66 which is adapted to be positioned by a pressure responsive device 67. The pressure responsive device 67 consists of a pair of bellows 68 and 69 with bellows 68 being evacuated and bellows 69 being subjected to the pressure in the intake manifold 11 by means of a connection through a conduit 70 which also may connect to the manifold pressure controller 17. This device senses to absolute manifold pressure and is connected to the adjuster 66 by suitable connecting means 71.

A reset amplifier 72 is provided to sense deviations in the manifold pressure from the pressure selected by the power control lever 38. When there is a deviation, there will be an electrical unbalance on the input to amplifier 72 and this unbalance will be an alternating current of one phase or the other depending on the direction of unbalance. The output of the amplifier will accordingly be a signal of reversible phase and will position a reset motor 73 in a direction depending upon the phase of the input signals to amplifier 72. A potentiometer 74 is provided to select the direct effect the pressure responsive network 60 will have on the main control network in a manner that will be understood when the discussion of the operation is had. A switch 103 is provided for deenergizing the reset motor whenever lever 18 reaches an end position. This is accomplished by suitable coupling means 104.

A reset network 75 has power supplied thereto by a transformer 76 which has a primary winding 77, connected to a suitable source of power, and a secondary winding 78 which is tapped at 79. Connected to the secondary winding 78 is a reset authority potentiometer 80 and a reset potentiometer 81. The adjusting means of the potentiometer 81 is variably adjusted by the reset motor 73 through appropriate coupling means 82.

The follow up network of the subject electrical network is indicated by the numeral 83 and may be seen to consist of a transformer 84 having a primary winding 85 and a secondary winding 86 with a center tap 87. Connected to the secondary 86 is the follow up potentiometer 88 which has its adjusting means or slider variably positioned by a control motor 89 acting through suitable coupling means 90 and 91. Sensing the balance of the main control network is an amplifier 92 which is operative when there is an unbalance in the electrical network to drive the motor 89 in a direction dependent upon the direction of unbalance.

The amplifier 92 and the motor 89, preferably form a combination where the motor is reversibly driven by the amplifier in accordance with the direction of unbalance of the input signal to the amplifier and the motor is clutched to the output drive connection when the motor is operating. An arrangement very similar to this is shown in a Gille et al. Patent No. 2,425,733, issued August 19, 1947, where a pair of clutches are used to reversibly connect a continuously running motor to a shaft to be positioned. The present apparatus may use either a continuously operating motor or a motor that is energized when the clutches operate. When the motor is not operating, or is deenergized, it does not form a load on the positioning of the control point adjuster 18 by the manual operator 36 as it is not mechanically connected into the system. A switch 93 is provided for deenergizing the motor 89 so that when it is desired to manually accomplish the control function of the motor 89, the manual operator will not be working against the electrical signals of the electrical network and the motor. The slider of follow up potentiometer 88 will be moved but this requires negligible effort.

To obtain a non-linear relation between the movements of the selecting lever 38 and the control motor 89, the camming device 42 is provided. This camming device includes a cam 94 which has a camming rise surface 95, a dwell surface 96 and a further camming rise 97. Riding on the cam surface is a spring biased cam follower 98 which is operative to position a bell crank arm 99 whose outer end is directly connected to the slider 41. When the follower 98 is riding on the riser surface 95 and the cam 94 is being rotated in a clockwise direction, the bell crank 99 will be moving clockwise until the follower 98 rides on the dwell surface 96. When on the dwell surface, further clockwise movement of cam 94 will not cause any movement of crank arm 99 until the follower 98 starts riding on the further rise surface 97 when once again the bell crank arm 99 will move in a clockwise direction. The ratio between movement of cam 94 and the positioning of the slider 41 is substantially as shown on the MAP curve of Figure 2.

The control network for the manifold pressure control motor which positions the control point adjuster 118 for the motor 110 includes the main selector network 39 which is also common to the control network for use with the engine 10. The calibration network for this second electrical network is indicated by the numeral 147 and consists of a cruise calibration potentiometer 148, a low power calibration potentiometer 149 and a high power calibration potentiometer 150. The cruise calibration potentiometer 148 is connected to the lower portion of secondary 45, effectively in parallel with cruise calibration potentiometer 48. Supplying power to the low and high power calibration potentiometers is a transformer 151 which has a primary winding 152, connected to a suitable source of power, and a pair of secondary windings 153 and 154 which are tapped at 155 and 156 respectively. A calibration selecting potentiometer is indicated at 157 and is provided with adjusting means 158 which is adjusted by the power selecting lever 38 and is connected thereto by the same coupling device 59 that couples the adjusting means 58 of calibration selector 57.

The pressure responsive portion of the subject control network is indicated by the numeral 160 and this network has power supplied thereto by transformer 161 and includes a primary winding 162, connected to a suitable source of power, and a secondary winding 163 which is tapped at 164. Connected to the secondary 163 is a potentiometer 165 with an adjuster or slider 166. The adjuster 166 is positioned by a pressure responsive device indicated at 167 and which device consists of a pair of pressure responsive bellows 168 and 169. The bellows 168 is an evacuated bellows while the bellows 169 senses to manifold pressure through a suitable conduit 170 and thus causes the device to respond to absolute manifold pressure. The pressure responsive device is connected to the adjuster 166 through suitable coupling means 171. A potentiometer 174 is provided to select the direct effect the pressure responsive network 160 will have upon the main control network.

The numeral 175 represents the reset network which has power supplied thereto by transformer 176. The transformer 176 has a primary winding 177, connected to a suitable source of power, and a secondary winding 178 which is tapped at 179. Connected to the secondary 178 is a reset authority potentiometer 180 and a reset control potentiometer 181 which has its adjusting means positioned by the reset motor 173. A switch 105 coupled to lever 118 by coupling means 106 is opened whenever lever 118 reaches an end position.

A follow up network 183 has as a source of power a transformer 184 which has a primary winding 185, connected to a suitable source of power, and a secondary winding 186 which is tapped at 187. A follow up potentiometer 188 is connected to the secondary winding 186 and the adjusting means of this follow up potentiometer is positioned by a control motor 189, acting through suitable connecting means 190 and 191. The direction of unbalance of the electrical network or the phase of unbalance is detected by the amplifier 192 and this amplifier is operative to drive reversibly the motor 189 until such time as the network has become rebalanced. This amplifier and motor combination are the same as amplifier 92 and motor 89. A switch 193 is provided to open circuit the motor connection between the amplifier and motor to deenergize the motor and clutches so that positioning of the manual operator 136 may be accomplished without working against the main electrical network, as occurs when switch 36 is opened.

A separate electrical network is used for positioning the engine speed control point adjuster 31. This network includes a main control potentiometer network 200 which has as a source of power a transformer 201. The transformer 201 has a primary winding 202, which is connected to a suitable source of power, and a secondary winding 203. Connected to the secondary winding 203 is an adjusting potentiometer 204 having adjustment means 205. The adjusting means 205 is positioned by the operation of the adjusting lever 38 through suitable coupling means which give a nonlinear function to the operation of the slider 205 when there is a linear operation of the adjuster 38. This coupling means may consist of a cam surface 206 suitably connected to the lever 38 by means 207 and a cam follower 208 which, by reason of a compression spring 209, is riding on the surface of the cam 206. Connected to the follower 208 may be a suitable crank arm 210, which is pivoted at 211 so that the outer end of the crank arm 212, which is connected to the adjuster 205 by means 213, will go through the desired nonlinear function when the cam 206 is positioned by the lever 38.

The cam 206 has a riser surface 195, peak surface 196 and a fall surface 197. When the cam is rotating in a clockwise direction with the follower 206 on the riser surface 195, the bell crank 210 will be moving in a clockwise direction until it reaches the peak surface 196. With continued rotation of cam 206, the follower 208 will move onto the fall surface 197 where the bell crank will be rotated in a counterclockwise direction. The relation between the movement of cam 206 and the resultant positioning of the slider 205 is substantially that shown on the R. P. M. curve in Figure 2.

A calibration network 215 is provided for maintaining the desired relation between the adjustment of the lever 38 and the positioning of the adjuster 31 on the speed controller 30. This calibration network includes a cruise calibration potentiometer 216, a low power calibration potentiometer 217 and a high power calibration potentiometer 218. Supplying power to the high and low calibration potentiometers is a transformer 219 which has a primary winding 220 and a pair of secondary windings 221 and 222 which are tapped at 223 and 224 respectively. Connected to the taps of the two secondary windings 221 and 222 is a calibration selecting potentiometer 225 which has adjusting means 226, which adjusting means are variably positioned by the lever 38 through the coupling means and camming means which positions the selector 205 on selecting network 200.

The speed sensing network for this control network is indicated by the numeral 227 and this network includes an authority control potentiometer 228. The source of voltage for this network, which source is actually the speed sensing voltage, is a velocity generator 229 which consists of an armature 230 connected to the motor 32, an energizing or input winding 231, which is connected to a suitable source of power, and an output winding 232. This velocity generator is of the type which has a frequency output on the output winding which corresponds to the input frequency on the input winding and whose voltage output corresponds to the velocity or speed of rotation of the armature. In other words, the input winding 231 has a constant frequency applied thereto and the frequency of this input, which will be the same as that applied to all of the network primary windings, will be the frequency of the output voltage on the winding 232. The armature rotating in the field generated by the winding 231 effectively distorts this field and this distortion is a direct function of the speed of rotation of the armature 230. When the field is distorted, the lines from the winding 231 will link the winding 232 so that there will be an output voltage and this output voltage will be directly varying with the speed of the rotation of the armature 230, and hence of motor 32.

Detecting the unbalance of the electrical network is an amplifier 235 which is of the same type as employed for use with motors 189 and 89. When there is an unbalance in the electrical network, the amplifier 235 will be operative to position a reversible control motor 236 in a direction depending upon the unbalance of the network and which has its output shaft connected by suitable coupling means 237 and 238 to the adjuster of the speed and synchronizer controller 30. Also connected to the output shaft of the motor 236 is another velocity generator 239 which serves an an antihunt device in the subject control network. This velocity generator consists of an input winding 240, an armature 241, connected to the motor 236 by suitable coupling means 243, and an output winding 244. Connected across the output winding 244 is an authority control for the velocity generator output in the form of a potentiometer 245.

A switch 246 is provided for deenergizing the motor 236 whenever the pilot or operator desires to position the control point adjuster 31 by way of the manual operator 334. The opening of the switch functions the same as the opening of the switches 93 and 193 in the circuits of motors 89 and 189.

Cruise calibration potentiometers are shown for the control networks of the manifold pressure controllers for engines number 3 and 4, not shown, and these potentiometers are identified by the numerals 248 and 348. The output from the engine speed and synchronizer generator 33 would also be used to connect to a suitable comparing device for engines number 3 and 4 and the connections running from the generator 33 are shown upon the drawing.

*Operation*

In considering the operation of the subject apparatus, a discussion will be had on the pressure regulating portion of the control apparatus first. It is desired that movement of the power selecting lever 38 be effective to position the control point selector 18 of the manifold pressure controller 17 so that a substantially constant pressure will be maintained in accordance with the setting of the manual lever 38. It will be assumed that the electrical switch 93 is in the closed position so that the motor 89 will be operative when there is an output from the amplifier 92. The position of the lever 38 determines the balance point of the electrical network which balance point determines the position of the motor 89. This electrical network consists of a plurality of separate electrical networks connected in series and these networks include the selection network 39, calibration network 47, pressure responsive network 60, reset network 75, and the follow up network 83.

A series circuit may be traced from the ground terminal 280 through slider 41, selector network 39, conductors 100 and 101, cruise calibration potentiometer 48, conductor 281, conductors 282 and 301 branching out to the low and high power calibration potentiometers 49 and 50, taps 53 and 56 through conductors 303 and 302 to the calibration selecting potentiometer 57, slider 58, conductor 304, conductor 305, pressure responsive network 60, slider 66, conductor 300, reset network 75, slider 81, conductor 306, follow up network 83 and conductor 307 to the input of amplifier 92.

The alternating current phasing of these series connected networks must be such that it is possible to balance the entire electrical network so that there will be no output from the network on the input of the amplifier 92 when there is not need for operation of the motor 89. This phasing may be set up so that during one half cycle the upper terminal of the secondary 45 is positive, as shown upon the drawing, and the upper terminal of the secondaries 63, 78 and 86 are negative, also shown upon the drawing. As the calibration potentiometers 49 and 50 have center tapped secondaries, they may be neglected for the moment for their phases may be positive or negative depending upon the direction of displacement of their sliders from their center position.

Assume now that the electrical network and the lever 38 are adjusted to the position shown upon the drawing or in the cruise or central range of operation. Under these conditions, the slider 41 of the selector potentiometer 40 will be in a central position. When in this position there will be a voltage unbalance between the slider 41 and the adjuster of the calibration potentiometer 48, also in its central position. This voltage when measured at the slider of potentiometer 48 with respect to slider 41, will be slightly negative. If the adjusters of the calibration potentiometer 49 and 50 are in their central position there will be no effect from these potentiometers upon the electrical network. Further, the positioning of the slider 58 on the potentiometer 57 will also have no effect upon the balance of the electrical network.

The pressure responsive network 60 will have to have its slider 66 adjusted so that the unbalance on this network will be equal and opposite to the unbalance of the selecting network 39. This will mean that the slider 66 must be displaced on the potentiometer 65 slightly below center so that there will be a voltage on slider 66 when measured with respect to tap 64 which will be slightly positive. Neglecting for the moment the operation of the reset motor and amplifier, and assuming the reset network is balanced, the voltage across the reset network 75 will be zero. Similarly, the follow up network 83 will be such that there will be no output voltage across it between the tap 87 and slider 88. The input to the amplifier 92 will be the sum of the voltages of the individual series connected networks so that the the slightly negative voltage on the networks 39 added to the slightly positive voltage on the network 60, and zero volts on the remainder, there will be no voltage on the input of the amplifier 92. With no input on the amplifier 92 there will be no output tending to cause rotation of the motor 89 and positioning of the control point selector 18 of the manifold pressure controller.

If there should be a decrease in pressure in the intake manifold 11, the pressure responsive device 67 will be effective to move the slider 66 on the potentiometer 65 in a downward direction so that the voltage drop across the pressure responsive network, when measured at slider 66 with respect to the tap 64, will be more positive. With the adjuster of potentiometer 74 in the extreme right hand position, as before, this unbalance voltage on the pressure responsive network 60 will be effective to create an unbalance on the input of amplifier 92. With an unbalance voltage on the input of amplifier 92, there will be an output voltage and the motor 89 will tend to rotate and position the control point adjuster 18 in a direction to cause an increase in manifold pressure. As the motor 89 is moving the control point adjuster 18 to a new position, the slider on the follow up potentiometer 88 is also being adjusted. The movement of the slider in the follow up network 83 will result in a rebalancing of the entire electrical network as the movement of this rebalancing slider will be in an upward direction so that the voltage on the slider with respect to tap 87 will be slightly negative. This slightly negative voltage on the follow up network 83 will be equal and opposite to the unbalance created by the decrease in pressure in the manifold 11. With the repositioning of the control point adjuster 18, there will be a change in the position of the throttle 16 on the intake manifold and the manifold pressure 11 will increase. The increase in pressure on the pressure responsive device 67 will result in the repositioning of the slider 66 and a subsequent repositioning of the follow up 83 back to such a position that the change in the throttle 16 position will maintain the desired manifold pressure in the intake manifold 11.

Should there be an increase in pressure in the intake manifold 11, the reverse of the above described operation will take place and the apparatus will be effective to cause the throttle 16 to be closed to a sufficient degree to decrease the manifold pressure to the desired value. Similarly, movement of the manual selector 38 will result in an unbalance on the selector network 39 which unbalance must be cancelled out by the movement of the slider 66 in the pressure responsive network 60 and in so moving there will be a resultant repositioning of the follow up potentiometer 88 and the control point adjuster 18 by the control motor 89.

The operation of the reset amplifier motor as well as the reset network, not yet fully considered, play an important part in the present invention in maintaining a substantially constant manifold pressure on the intake manifold regardless of indexing errors on the manifold pressure controller 17 or the tendencies for this type of apparatus to deviate from the manifold pressures selected by the manual selector when there is a change in the operating load condition. It is well known that in a proportioning type of control system employing a follow up controller, that increases or decreases in load, for a particular setting of the control system, result in changes in control point. The change in control point is often referred to as "droop" from the control point. This droop may be corrected by superimposing on the control system a signal which is indicative of a deviation of the controlled condition from the selected value. This signal may be derived from a reset apparatus which is effective to introduce an electrical signal into the apparatus that will compensate for any "drooping" tendencies and will maintain the condition at the point selected by the manual selecting lever. This is where the reset portion of the subject apparatus comes into play.

The reset amplifier 72 has for an input that portion of the electrical network which includes the manual selector network 39, the calibrating network 47, and the pressure responsive network 60. Whenever there is an unbalance voltage existing between the slider 41, of the manual selector network 39, and the slider 66 on the pressure responsive network 60, that unbalance voltage will appear on the input of the amplifier and will be effective to cause rotation of the motor 73. This motor rotates relatively slowly when compared with the operation of motor 89. The motor 73 will continue to operate until such time as that unbalance voltage is removed and this unbalance voltage will be removed only when the pressure responsive network 60 has a voltage therein which is equal and opposite to the voltage existing across the selecting network 39 and the calibration network 47. If there is an unbalance on the input of the reset amplifier 72, the motor 73 will be operating to reposition the reset potentiometer 81.

The positioning of the reset potentiometer 81 results in the introducing of an unbalance signal in the electrical network affecting the input of amplifier 92. This unbalance voltage will be in such a direction as to cause the amplifier 92 to drive the motor 89 and reposition the control point adjuster 18 which in turn will affect the positioning of the throttle 16 to an extent that will change the intake manifold pressure. The change in the intake manifold pressure will result in the positioning of the slider 66 in the pressure responsive network 60 to a position where it will effectively cancel out the unbalance voltage existing across the calibration network 47 and the selecting network 39. When there is no input on the amplifier 72, the motor 73 will remain stationary and the effect of the reset network 75 upon the entire electrical control network on the input of amplifier 92 will remain constant.

Adjustment of the reset authority potentiometer 80 will result in the controlling the effect the reset motor 73 will have upon the input of amplifier 92. Thus, with the slider of the authority potentiometer adjusted to its uppermost position, the full voltage of the secondary 78 will be applied to the reset potentiometer 81. On the other hand, when the slider of the authority potentiometer is in the extreme lower position, there will be no voltage applied to the reset potentiometer 81 and it will have no effect upon the input of amplifier 92.

When the slider of the authority potentiometer 80 is in the extreme lower position, the pressure responsive network 60 will be operating directly in series with the follow up potentiometer network 83 on the intake of amplifier 92 and there will be a fixed voltage introduced into the main control network by the reset network 75 and this voltage is dependent upon the magnitude of the voltage between the tap 79 and the lower terminal of secondary 78. When the authority potentiometer 80 is in the upper position, the pressure responsive network 60 will again affect the unbalance of the electrical network on the input of amplifier 92 directly in a circuit that may be traced from the slider 66 through conductor 30, the slider of potentiometer 74 in the right hand position, center tap 79, network 75, slider 81, conductor 306, tap 87, follow up network 83, and the follow up potentiometer slider of potentiometer 88 to the input of amplifier 92. Here, in the last arrangement, the reset network 75 will be effective in accordance with the positioning of the slider of the potentiometer 81 by the reset motor 73.

The pressure responsive network 60 is also indirectly affecting the unbalance of the electrical network on the input of amplifier 92 by its effect on the input to the reset amplifier 72 and the resultant repositioning of the reset potentiometer 81 by the reset motor 83, when there is unbalance on the input to the reset amplifier.

If it is desired that the reset amplifier be the only device affected by the pressure responsive network 60, the slider of the potentiometer 74 may be moved to the extreme left hand position so that the pressure responsive network will no longer be connected directly in series in the network between the selecting network 39 and the follow up network 83 on the input of amplifier 92. Under this situation, the pressure sensed by the bellows 67 effects an unbalance in the pressure responsive network 60 which in turn causes operation of the reset amplifier if that unbalance indicates a deviation from the value selected by the selecting lever 38. This unbalance causes rotation of the reset motor 73 and a repositioning of the reset potentiometer 81 in the reset network 75. The operation of the reset motor 73 in repositioning the slider of the reset potentiometer 81 will result in an unbalance which will correspond in direction to the direction of deviation of the pressure sensed by the bellows 67. The unbalance signal on the reset network will cause the amplifier 92 to drive the motor 89 and reposition the control point adjuster 18 and also to cause operation of the follow up slider of the potentiometer 88 so that the motor will try to maintain the entire electrical network in a balanced condition. The only way in which the reset amplifier will no longer be effective is when the pressure sensed by the pressure responsive device 67 has reached a value which corresponds to the value selected by the selecting lever 38 or the lever 18 has reached an end position where the switch 103 will open. In this manner, any indexing error that may exist in the manifold pressure selector 17 will be by-passed and the apparatus will continue to make an adjustment of the control point selector 18 until such time as the manifold pressure in the intake manifold 11 has reached the desired value. If the switch 103 were not provided, the reset amplifier would continue to operate if there was a signal indicating an unbalance and the lever 18 were at an end position. This would result in the reset potentiometer continuing to add in a signal which would have to be removed before the control could be effective in the other direction.

It will be noted that the aforedescribed electrical network consists of a main proportioning type of electrical network with a follow up device operated directly by a controlling motor with a floating network superimposed thereon which has as its follow up device the potentiometer positioned by resultant change in a controlled condition rather than by the repositioning of a controlling motor. This makes it possible to have a very high accuracy in the selection of manifold pressures on the intake manifold 11 as the reset amplifier is effective to cause repositioning of the control point adjuster 18 until such time as the pressure condition on the intake manifold is at the value selected by the selecting lever 38, regardless of any indexing error on the control device 17.

Thus, with the slider of potentiometer 74 in the extreme left hand position, the control apparatus for the manifold pressure is a remote positioning system with a signal slowly superimposed on this system by the reset amplifier and motor when there is a deviation of the manifold pressure from the desired value. With the slider of potentiometer 74 in the extreme right hand position, the apparatus is a regulator manifold pressure controller with the changes in manifold pressure directly and quickly affecting the positioning of the adjuster 18 with the reset amplifier and motor adding in an additional signal when there is a deviation in the controlled pressure from the desired value, whether that deviation is due to "droop" or indexing errors in pressure controller 17. Should there be a failure of the hydraulic controls in the manifold pressure controller 17, the present apparatus will still automatically control the positioning of throttle 16 to maintain the selected manifold pressure as the selector 18 is effectively directly coupled to the adjuster 19 when the hydraulic pressure fails, as is set forth in the above-mentioned patent to Cole, No. 2,444,185.

The calibration network of the subject apparatus is so designed that it is possible to set the calibration of the apparatus at a plurality of positions and select the calibration of the apparatus between those points when the power selecting lever 38 is moved from a maximum to a minimum position. This type of calibration is accomplished by the calibration network indicated at 47. In selecting the desired calibration, the power selecting lever 38 should be moved to one extreme position, for example the low power position, at which time the slider 41 will be moved to the upper position, when the slider 58 of the selecting potentiometer 57 will be moved to its upper extreme position since the sliders of both potentiometers are mechanically interconnected to the output end of bell crank arm 99 by means indicated by the numeral 59. When the slider 58 is in its upper extreme position, the portion of the electrical calibration network affecting the entire control network will include the cruise calibration potentiometer 48 and the low power potentiometer 49. This circuit may be traced from the cruise calibration potentiometer 48 through conductor 281, low power calibration potentiometer 49, secondary 53, tap 55, conductor 303, and slider 58 at the upper end of selecting potentiometer 57.

In adjusting the calibration at this particular point of operation, the cruise calibration potentiometer 48 is set at its mid-position and the slider of the low power calibration potentiometer is adjusted so that the manifold pressure is at a value desired for that particular positioning of the power selecting lever 38. The power selecting lever is then moved to the high power position at which time the calibration networks affecting the entire control network include the cruise calibration potentiometer 48 and the high power calibration potentiometer 50. This will be understood since a direct electrical circuit may be traced from the slider of the cruise calibration potentiometer 48 through a conductor 301 to the slider of the high power calibration potentiometer 50, through tap 56 of secondary 54, and conductor 302 to the slider 58 of the selecting potentiometer 57, now in its extreme lower position. With the power selecting lever in the high power position, the high power calibration potentiometer 50 will be adjusted so that the desired amount of manifold pressure will be had for this high power position. The selecting lever 38 is then moved to the central range of movement or the cruise position where, if necessary, the cruise calibration potentiometer 48 is adjusted. Inasmuch as the adjustment of the cruise calibration potentiometer will have an effect upon the low power and high power calibration potentiometers, it is necessary to go back to the calibration of the low and high power potentiometers so as to balance out the effect of the change of the cruise calibration potentiometer 48 upon the low and high power calibration potentiometers. It will be obvious that when the power selecting lever 38 is in the cruise position and the calibration selecting potentiometer slider 58 is in the cruise position, both the low and high power calibration potentiometers will have an effect upon the control network and will be effectively operating in series with the cruise calibration potentiometer 48.

In actual practice, the calibration of the manifold pressure control networks will be done last. This will be understood when the calibration of the speed selecting network is discussed.

The electrical control network for the manifold pressure controller 117 corresponds identically to that of the above described circuit in operation and design. The same would apply to the control networks for engines 3 and 4, not shown. The need for the pressure responsive device separated from the pressure responsive device portion of the manifold pressure controllers 17 and 117 may be understood when it is realized that the power output of all engines must be synchronized. As the manifold pressure is a direct function of the power output, this power output synchronization can only be accomplished in part by a device that can measure the absolute pressure in the intake manifold of each engine and maintain that pressure at a value selected by a single selector common to each control network. This arrangement makes possible the maintaining of a constant pressure regardless of the indexing errors of the individual manifold pressure controllers or the "drooping" tendencies when there are changes in load.

The camming means 42 is provided to give a desired programming in the operation of the apparatus in selecting manifold pressure. Thus, referring to Figure 2, when the power selecting lever is in the low power position, the manifold pressure is at its lowest value. As the power selecting lever is moved toward its high power position, the manifold pressure will increase until the cruise range is reached where the manifold pressure will be held constant until the lever is moved into the high range of power where the manifold pressure will increase to a maximum value. The calibration networks 47 and 147 are not provided for setting up the non-linear operation obtained but merely to establish fixed values of manifold pressure at predetermined points in the ranges of operation of the apparatus.

When the pilot desires to make an adjustment of the manifold pressure controllers independent of the control network, it is but necessary to open the switches 93 and 193 so that the electrical circuits between the amplifiers and motors which position the control point adjusters are open. When this is done, the manual operators 36 and 136 can be used to position the control point adjusters 18 and 118 respectively, without having the operator work against the motor and amplifier combination. As soon as the switches are returned to their closed positions, the power selecting lever 38 and the electrical network that couples the lever 38 to the motor 89 and 189 will be effective to position the control point adjuster in the manner described above.

The next to be considered in the operation is the control of the engine speed and synchronizer controller 30. As mentioned above, the lever 31 is effective to select the engine speed to be maintained and this selection is accomplished by the variable speed, standard, motor generator combination 32, 33 where the output frequency of the standard generator is compared with the frequency output of generators driven by each of the engines. The speed of the standard generator is selected by a speed selecting lever 31 and the positioning of this lever may be accomplished either manually, by the lever 334, or by the speed selector motor 236. The speed selector motor 236 is driven by the phase sensitive amplifier 235 in one direction or another in accordance with the unbalanced voltages on the input to the amplifier 235. The input electrical network to the amplifier 235 consists of a plurality of series connected electrical networks which include a selecting network 200, a calibration network 215, a sensing network 227 and an antihunt network which includes potentiometer 245. The electrical connections for these networks may be traced from the ground terminal 260 through slider 205 of the selecting network 200, through calibration potentiometer 216, conductor 261, through either conductors 262 or 263, through the low and high power calibration networks to conductors 265 and 264 which lead to the calibration selecting potentiometer 225, and from there through conductor 226, sensing network 227, conductor 267, antihunt potentiometer 245 and conductor 268 to the input of amplifier 235.

The phasing of the secondary winding 203 associated with the selecting network 200 is such that, during the same half cycle previously considered, the upper terminal is positive when the phasing on the potentiometer 227 is positive on its upper terminal. With this phasing, the voltage on conductor 261 with respect to ground terminal 260 on the cruise calibration potentiometer 216 will be slightly negative while the voltage measured on conductor 267 with respect to 266 on the sensing portion of the network, will be slightly positive under balanced conditions, the slightly negative voltage from the selecting network 200 will be equal to and opposite the positive voltage existing on the potentiometer 227. The effect of the calibration potentiometers may be neglected for the moment as both the high and low power calibration potentiometers may be adjusted so that their phase output is either positive or negative depending upon which way their sliders are adjusted from their center positions.

As mentioned above, supplying voltage to the sensing network 227 is a velocity generator type of device whose voltage output varies directly with the speed of rotation of the generator. The generator 229 supplies this variable signal voltage and the speed at which this generator is driven is directly proportional to the speed of the engines as the velocity generator is driven at the same speed as the standard generator 33. The output winding 232 is connected directly across the terminals of the follow up potentiometer 227 and therefore the voltage appearing upon the potentiometer 227 will vary directly with the speed of rotation of the rotor 230 of the generator 229. Inasmuch as the direction of rotation of this generator is always the same, the phase of the voltage on the output will be constant with the magnitude of the output voltage being the only variable. For a particular setting of the selecting potentiometer 205, a constant engine speed should be maintained. If, for any reason, the speed of the motor driving the standard generator should change, there will be a change in the speed of rotation of the velocity generator 229 so that the output voltage on the winding 232 will change.

If there should be a decrease in the speed of the standard generator 33, the output voltage on the velocity generator 229 will decrease and this decrease will be sensed by the amplifier 235. With the less positive voltage on the input to amplifier 235, the amplifier will have an output which will tend to drive the motor 236 in a direction to position selector 31 in a speed increasing direction. The motor 236 will continue to operate until such time as the selector 31 has caused the motor driving the standard generator to increase the speed to the point selected by the position of the slider 205 in the selecting network 200. If there should be a speed increase on the motor driving the standard generator, the voltage output from the velocity generator 229 will increase and the voltage applied to the potentiometer 227 will also increase. This increase in voltage will cause the amplifier to be operative to reposition the motor 236 and the selector 31 so that the speed of the motor driving the standard generator will decrease.

Movement of the slider 205 will accomplish substantially the same result as an increase or decrease in the speed of the motor driving the standard generator as there will be an unbalance in the electrical network feeding into the amplifier 235. If the slider 205 is moved in an upward direction to indicate a need for an increase in speed, the output voltage from the selecting network 200 will be more negative and will be balanced out by a more positive voltage from the velocity generator 239 when the standard speed has increased sufficiently. If the slider of the selector network 200 is moved in a downward direction to indicate the desire for a decrease in speed, the output voltage from the selection network will be less negative. With this less negative voltage in the entire control network, there will be an input on the amplifier 235 which will cause the motor 236 to rotate and reposition the selector 31 in such a direction that there will be a decrease in the speed of the motor driving the standard generator and the velocity generator 229. As soon as the output voltage from the velocity generator 229 is equal in magnitude to the voltage on the selection network 200 the control network will be balanced and there will be no input on the input of amplifier 235.

As the electrical network which is used to position the motor 236 is essentially a floating network with no direct follow up accomplished by the positioning of the motor 236, it is necessary to provide some device which will prevent hunting of the control motor about the balance point. This is accomplished by a further velocity generator 239 which is driven by the motor 236. As the motor 236 is a reversible motor, it is possible to reverse the direction of rotation of the velocity generator 239 and therefore reverse the phase of the voltage on the output winding 244. The magnitude of the voltage on the winding 244 will be dependent to a certain degree upon the speed of rotation of the rotor 241.

In operation, with the motor 236 driving the selector 31, the change in position of the selector 31 will be changing the speed of the motor driving the standard generator and the velocity generator 229 tending to rebalance the electrical network. As the balance point is approached, the unbalance voltage will be decreasing in magnitude and when it has decreased sufficiently the output voltage from the velocity generator 239, as appears on the winding 244, will be greater than the unbalance voltage and will be in a phase that will tend to unbalance the electrical network in the opposite direction. This reversal of unbalance on the input of amplifier 235 will tend to cause the motor 236 to be driven in the opposite direction, but as the motor has reverse torque applied thereto by the amplifier, it will decrease its speed of rotation in its initial direction and will also decrease the speed of rotation of the rotor 241 of velocity generator 239 so that the reverse unbalance signal from the velocity generator 239 will decrease in magnitude. Once again the unbalance from the main electrical network will become effective to control the positioning of the motor 236 until once again the velocity generator signal is greater than the unbalance signal and the electrical network. In this manner the slider 31 is positioned in the desired manner and when it has been positioned sufficiently, the motor is damped to a stop by the effect of the velocity generator 239 introducing a reverse torque signal into the amplifier 235. This prevents any overshooting and hunting of the motor 236 and the control lever 231.

The calibration of the speed control network may be accomplished by the calibration network 215 which includes the cruise calibration potentiometer 216, the low power potentiometer 217 and the high power potentiometer 218. This calibration network is almost identical to the calibration networks 47 and 147. The present calibration network 215 has connected across the output thereof a calibration selecting potentiometer 225 and a slider 226, which may be connected to move simultaneously with the slider 205 on the selecting portion of the apparatus. The calibration may be accomplished in substantially the same way as set forth in the pressure responsive networks making an adjustment of the low power potentiometer 217 when the selecting calibration lever 38 is in a low power position and adjusting the high power potentiometer 218 when its selecting lever 38 is in the high power position, and finally adjusting the cruise calibration potentiometer when the lever 38 is moved to the cruise position. In considering the operation discussed above, it will be obvious that the calibration may be accomplished while the engines are not running since the speed indicating signal is derived from the standard motor generator combination. Therefore, the engine speeds should be calibrated first with the engines off. This will establish a reference point by which it will be possible to set up the desired power output for the engines.

As it is desired to coordinate the control of both the pressure controlling portion of the apparatus and the speed controlling portion of the apparatus, it is necessary that the power selecting lever 38 be coupled to the selecting portion of the speed selecting network 200. This is accomplished by the lever 38 operating through connecting means 205 to drive the cam 206. The cam follower 208 and a bell crank 210, pivoted at 211, cause a positioning of the slider 205 upon the potentiometer 204. The non-linear function desired is substantially as shown in Figure 2, where it may be seen that as the power selecting lever 38 is moved from the low power to the high power position, the engine speed is at a first value in the low power position and decreases to a minimum value just before the cruise range is reached at which time the engine R. P. M. increases up to a maximum value which is reached at the high power position and which is substantially higher than the R. P. M. at the low power position. The function of the calibration network is to merely straighten out or correct the adjustments made by the cam action of cam 206 and not to give the network its nonlinear function.

The reason for the nonlinear operation of the engine speed is based upon the fact that when the low power position is used, the craft is generally making a landing, and when landing a relatively high engine speed will mean that the propeller pitch is relatively small. With small propeller pitch, there is a breaking action of the air upon the propellers that tends to decrease the plane's speed. Further, if it is desired to suddenly apply a high power, the propeller pitch is adjusted for high power and only manifold pressure will have to be increased to accomplish this increase in power when the power selecting lever 38 is moved to the high power position.

If it is desired to manually position the speed selecting lever 31 by the manual operator 34, it is necessary first to open the switch 246 so that the movement of the lever 34 will not work against the motor and amplifier of the control network. If automatic control is again desired, the switch 246 should be closed and any unbalance that exists in the electrical network will result in the operation of the motor 236 so that the speed selected by the selector 31 will correspond to the speed desired, as indicated by the position of the slider 205 upon the potentiometer 204.

Considering the operation of the overall control apparatus, it is desired that the power output of each engine be substantially the same as all of the other engines and this is accomplished by the synchronized control of the manifold pressure and the engine speed of each engine on a predetermined program. The manual power selector lever 38, when moved from the low to the high power position, causes an increase in manifold pressure on each of the engines except in the cruise range where the pressure is constant and causes the engine speed to first decrease and then increase as shown by the curves of Figure 2. By properly choosing the correct relation between the engine R. P. M. and manifold pressure, it is possible to have a predetermined power output from the engine for each position of the power selecting lever 38 and a relationship between manifold pressure and engine speed that will insure economical operation of the engines at all speeds. Obviously, these predetermined power outputs may be arranged in any desired manner by variations in the camming controls and by proper calibration of the calibration networks 47, 147 and 215 so that as the selector lever 38 is moved through its range of movement the calibration of each of the individual control networks will be at a desired value at a number of points and variably selected between those points.

From the foregoing it may be seen that we have provided a single lever power control apparatus which is used to variably adjust manifold pressure controllers and an engine speed controller on the engines of a multiengine power plant and have provided means therewith for coordinating the control of the manifold pressures and engine speeds of all of the engines regardless of any indexing errors that may exist in the controllers for the engine speed and manifold pressure. While we have disclosed one particular embodiment of our invention, it will be obvious to those skilled in the art that this type of control may be accomplished in other ways and therefore we intend to be limited solely by the scope of the following claims.

We claim as our invention:

1. Control apparatus for use with a plurality of engines each having a manifold with a throttle therein, comprising in combination, manifold pressure controlling means for each engine connected to the throttle of each engine, engine speed and load controlling means connected for controlling engine loading and thereby controlling the engine speed of each engine, manifold pressure controlling motor means for each engine connected to its respective manifold pressure controlling means for variably adjusting the manifold pressure controlling means, engine speed and load controlling motor means connected to said engine speed and load controlling means, a single manually operable power selecting lever for selecting the power output of the engines, individual coupling means for coupling said power selecting lever and each of said manifold pressure controlling motor means and said speed and load controlling motor means, said coupling means comprising amplifying means and a balanceable electric network circuit for calibrating and rebalancing, said network circuit including a first potentiometer having a resistor and an adjustable wiper, a first source of voltage having two end terminals to which the resistor of said first adjustable potentiometer is connected and a tap, a second potentiometer having a resistor and an adjustable wiper, said resistor of the second potentiometer being connected between one end terminal and said tap of the said first source of voltage, a calibration circuit means having an input terminal to which said wiper of the second potentiometer is connected and two output terminals, a third potentiometer having a resistor and an adjustable wiper, said resistor of the third potentiometer being connected across the two output terminals of said calibration circuit means, circuit means connecting the adjustable wiper of said third potentiometer to the respective manifold pressure controlling motor means and speed and load controlling motor means, mechanical means connecting said single manually operable power selecting lever to the wiper of said first potentiometer and the wiper of said third potentiometer of each coupling means, and a further source of voltage of variable magnitude depending upon the operation of said load and speed controlling motor means included in said coupling means coupling said single power selecting lever to said speed and load controlling motor means, said source having a polarity opposite that causing operation of said speed and load controlling motor means such that a balance of said balanceable electric network circuit will be anticipated to thereby prevent said speed and load controlling motor means from over-controlling said engine speed and load controlling means.

2. In control apparatus for use with a plurality of engines each having a manifold with a throttle therein and the speed of the engines is controlled by varying the loading of the engines, comprising in combination, a single manually operable power selecting lever for selecting the power output of the engines, manifold pressure controlling means for controlling the throttle of each engine, engine load and speed controlling means for controlling engine load and thereby controlling engine speed of the engines, manifold pressure controlling motor means for each engine connected to its respective manifold pressure controlling means for variably controlling said manifold pressure controlling means, engine load and speed controlling motor means connected to said load and speed controlling means for controlling said load and speed controlling means, coupling means including a plurality of electrical network means interconnecting said single power selecting lever and said manifold pressure controlling motor means and said load and speed controlling motor means such that all of said motor means will be operated in accordance with the positioning of said lever, said network means including a first potentiometer having a resistor and a wiper, a first source of voltage having two end terminals across which the resistor of said first potentiometer is connected and a tap, a cruise calibration potentiometer having a resistor connected between one of the end terminals and the tap of said first source of voltage and a wiper, a calibration circuit comprising second and third sources of voltage, low power calibration, high power calibration and calibration selecting potentiometers each having two end terminals and a wiper, electrical means connecting the end terminals of said low power potentiometer to said second source of voltage, second electrical means connecting the end terminals of said high power calibration potentiometer to said third source of voltage, third electrical means interconnecting said wipers of said cruise calibration, low power calibration, and high power calibration potentiometers, fourth electrical means connecting the end terminals of said said calibration selecting potentimeter to said second and third sources of voltage, means including an electrical circuit connecting said wiper of said calibration selecting potentiometer to one of said motor means, and mechanical means connecting said lever to said wipers of the calibration selecting potentiometer and the first potentiometer so that when said power selecting lever is in one extreme position the cruise calibration and low power calibration potentiometers are effective to calibrate said electrical network means and when said power selecting lever is in the opposite extreme position the cruise calibration and high power calibration potentiometers are effective to calibrate said electrical network means.

3. Control apparatus for use with an internal combustion engine driving a variable pitch propeller and having a manifold with a throttle therein, comprising in combination: a single manually operable power selecting control lever for selecting the power output of the engine; manifold pressure controlling means connected to the throttle for controlling the manifold pressure; propeller pitch controlling means connected to the propeller for controlling the pitch of the propeller; manifold pressure controlling motor means connected to said manifold pressure controlling means for variably adjusting said manifold pressure controlling means; propeller pitch controlling motor means connected to said propeller pitch controlling means for variably adjusting said propeller pitch controlling means; electric signalling, calibrating, rebalancing and amplifier means inter-connecting said lever and said manifold pressure controlling motor means and said propeller pitch controlling motor means such that both said motor means are operated in accordance with the positioning of said power selecting control lever, the signalling and calibrating portions of said electric signalling, calibrating, rebalancing and amplifier means each including a first adjustable potentiometer having a resistor and a wiper mechanically connected to said power selecting control lever for movement thereby, a first source of voltage having two end terminals to which the resistor of said first adjustable potentiometer is connected and a tap, a cruise power calibration potentiometer having a resistor connected between one of said end terminals and said tap of said first source of voltage and a wiper, a low and high power calibration circuit comprising second and third sources of voltage, a low power calibration potentiometer having end terminals connected to said second source of voltage and a wiper, a high power calibration potentiometer having end terminals connected to said third source of voltage and a wiper, and a calibration selecting potentiometer having end terminals connected to said second and third sources of voltage, respectively, and a wiper, the wipers of said cruise power, low power and high power calibration potentiometers being inter-connected; mechanical means connecting said power selecting control lever in operative relation to said calibration selecting potentiometer for adjustment by the power selecting control lever such that upon said power selecting control lever being in one extreme position said cruise power and low power calibration potentiometers are effective to calibrate said calibrating portions of said electric signalling, calibrating, rebalancing and amplifier means and upon said power selecting control lever being in the opposite extreme position said cruise power and high power calibration potentiometers are effective to calibrate said calibrating portions of said electric signalling, calibrating, rebalancing and amplifier means.

4. In power control apparatus for use with a plurality of combustion engines each having a manifold wherein the manifold pressure is controlled by a throttle and the speed of the engines can be controlled by loading the engines comprising, an adjustable manifold pressure control means for each engine connected to the throttle of each engine for controlling manifold pressure, manifold pressure controlling motor means for each engine connected to each manifold pressure controlling means, load and speed controlling means having a speed selector lever and an output connection for providing an output signal indicative of selected engine speed, a signal generating device for each engine connected to its respective engine and producing an output signal indicative of the actual speed of the engine, individual engine loading means connected to each engine for varying the load of the engine, individual loading motor means each having an input connection means and connected to its respective engine loading means for varying the effect of said engine loading means, a control unit for each engine connected to said output connection of said load and speed controlling means and the signal generating device of its respective engine, and to the input connection means of said individual load motor means such that the output signals of said load and speed controlling means and said signal generating devices can be compared to control the operation of said load motor means of each engine to vary the loading on each engine and thereby maintain a selected speed for each engine, load and speed controlling motor means connected to the selector lever of said load and speed controlling means, a single manual power control selector lever connected in controlling relation to said load and speed controlling motor means, and a second manifold pressure controlling means for each engine for also connecting said single manual power control lever in controlling relation to said manifold pressure controlling motor means of each engine, said second manifold pressure controlling means including a means responsive to the manifold pressure of each engine and a potentiometer having a resistor connected across a source of voltage, the wiper of each potentiometer being adjustable by its respective manifold pressure responsive means.

5. Power control apparatus for a combustion engine having a manifold and a throttle wherein the manifold pressure is controlled by the throttle and the speed of the engine is controlled by varying the loading of the engine comprising, in combination, a single manually adjustable power control lever, variable reference signal generating means comprising an input lever and an output connection means, said variable reference signal means providing a signal at said output connection means variable as a function of the position of said input lever, a speed signal device connected to the engine for producing an output signal indicative of the actual speed of the engine, a control unit, propeller pitch control means controlled by said control unit, means operatively connecting said speed signal device and said output connection means to said control unit, means operatively connecting said adjustable power control lever to the input lever of said signal generating means, a manifold pressure controller for said throttle, said controller having a manual selector means and including means responsive to manifold pressure and being operably connected to the throttle to control the position thereof and thereby control manifold pressure, manifold pressure controlling motor means, a second manifold pressure responsive means, potential varying means being adjusted by said second manifold pressure responsive means, coupling means including said potential varying means for connecting said single power control lever to said manifold pressure controlling motor means for operatively controlling said manual selector means of the manifold pressure control means, a separate manual override control lever connected to control said manual selector means to thereby position the throttle of the engine independently of said single power control lever, and second separate manual override control lever means connected to control said input lever of said signal generating means independently of said single power control lever.

6. Power control apparatus for an internal combustion engine driving a variable pitch propeller and having a manifold and a throttle in the manifold wherein the manifold pressure is controlled by the throttle, comprising in combination: a single manually adjustable power selecting control lever for selecting the power output of the engine; variable reference signal generating means comprising an input lever and output connection means, said variable reference signal generating means providing a signal at said output connection means variable as a function of the position of said input lever; a speed signal device connected to the engine for producing an output signal indicative of the speed of the engine; a load control device; propeller pitch control means connected to and controlled by said load control device; signal comparing means operatively connecting said speed signal device and said output connection means of said variable reference signal generating means to said load control device; first electrical coupling means comprising first electrical signaling means operatively connecting said power selecting control lever to said input lever of said variable reference signal generating means, a throttle controller connected in operative relation to the throttle, said throttle controller having a control point selector means and comprising means responsive to manifold pressure, said throttle controller operating to control manifold pressure by varying the position of the throttle; motor means connected to said control point selector means of said throttle controller; second electrical coupling means comprising second electrical signaling means operatively connecting said power selecting control lever to said motor means, said electrical coupling means further comprising electrical network circuit means including an electrical potential varying means and a source of energization connected to said electrical potential varying means; and second manifold pressure responsive means mechanically connected to said electrical potential varying means for adjusting said electrical potential varying means.

7. In power control apparatus for a plurality of combustion engines each having a manifold and a throttle wherein the manifold pressure is controlled by the throttle and the engine speed is controlled by engine loading comprising, in combination, a single manually adjustable power control lever, variable reference signal generating means comprising an input lever and an output connection means, said reference signal means providing a signal at said output connection means variable as a function of the position of said input lever, a speed signal device connected to each engine for producing an output signal for each engine indicative of the speed of each of the engines, a load control device for each engine connected to control an engine loading means for each engine, circuit means including comparing means for each engine connecting said output connection means of said variable reference signal generating means and said speed signal device of each engine to said load control device of each engine, means operatively connecting said power control lever to said input lever of said variable reference signal generating means, a controller for the throttle of each engine operatively connected thereto and each having a selector means and including means responsive to the manifold pressure of its respective manifold for controlling manifold pressure by varying the position of the throttle of its engine, manifold pressure controlling motor means for each engine, a second means responsive to manifold pressure of each engine, electrical coupling means for each engine connecting said single power control lever to said manifold pressure controlling motor means of its respective engine, electrical potential varying means connected to said electrical coupling means and adjustable by said second manifold pressure responsive means for each engine, and means for each engine for operatively connecting the motor means of each engine to the selector means of said controller of its respective engine.

8. In control apparatus for an internal combustion engine having a manifold with a throttle therein for varying manifold pressure and driving a variable pitch propeller; a manifold pressure controller means for actuating the throttle in response to the manifold pressure for maintaining the manifold pressure of the engine at a predetermined value, said controller means including a selector lever means for selecting the value of manifold pressure to be maintained by said manifold pressure controller means, engine speed signal generating means connected to the engine for generating a signal indicative of the actual speed of the engine, propeller pitch control motor means connected to the variable pitch propeller for varying the pitch of the propeller, control means for said pitch control motor means, adjustable signal generating means having a selector lever by which the output signal of said adjustable signal generating means can be selected, said adjustable signal generating means and said engine speed signal generating means being connected to said control means for controlling the propeller pitch control motor means, engine load and speed controlling motor means for adjusting the selector lever of said adjustable signal generating means, manifold pressure controlling motor means for operating the selector lever means of said manifold pressure controller means, a second means responsive to manifold pressure, electrical coupling means comprising a balanceable electrical network circuit, said network circuit including means adjustable by said second means responsive to manifold pressure, a main manual power selecting lever, means including said coupling means connecting said main manual power selecting lever to the manifold pressure controlling motor means, and means for connecting said main manual power selecting lever to said engine load and speed controlling motor means.

ALEX B. CHUDYK.
ROBERT J. KUTZLER.

References Cited in the file of this patent

UNITED STATES PATENTS

| Number | Name | Date |
| --- | --- | --- |
| 502,399 | Haskins | Aug. 1, 1893 |
| 1,995,594 | Wunsch | Mar. 26, 1935 |
| 2,255,753 | Bates | Sept. 16, 1941 |
| 2,314,610 | Day | Mar. 23, 1943 |
| 2,336,844 | Buck | Dec. 14, 1943 |
| 2,396,618 | Stieglitz | Mar. 12, 1946 |
| 2,403,243 | Seppeler | July 2, 1946 |
| 2,452,064 | Mayrath | Oct. 26, 1948 |
| 2,453,652 | Alexanderson | Nov. 9, 1948 |
| 2,480,758 | Mock et al. | Aug. 30, 1949 |
| 2,482,559 | Schneider | Sept. 20, 1949 |
| 2,485,431 | Chudyx | Oct. 18, 1949 |
| 2,521,244 | Moore, Jr. | Sept. 5, 1950 |

FOREIGN PATENTS

| Number | Country | Date |
| --- | --- | --- |
| 49,850 | France | May 1, 1939 |
| 883,676 | France | Mar. 29, 1943 |